Patented June 7, 1949

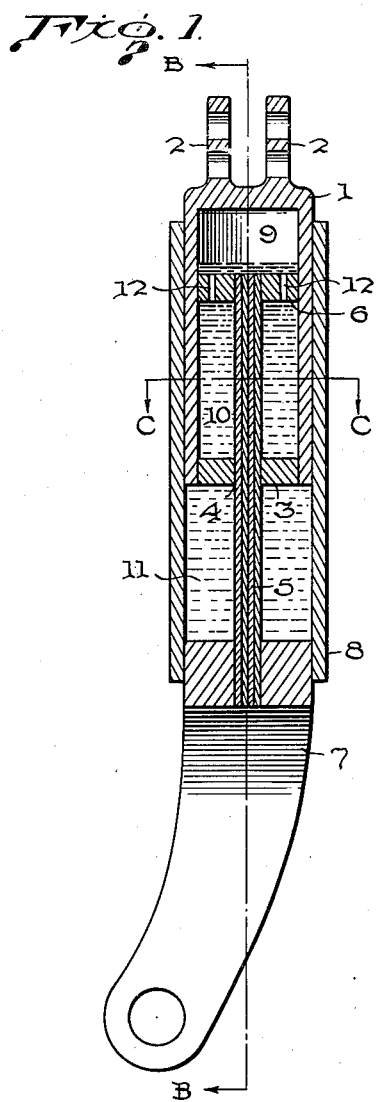

2,472,415

UNITED STATES PATENT OFFICE 2,472,415

CROSS-WIND LANDING GEAR SHOCK
ABSORBER FOR AIRPLANES

John Harlin Geisse, Washington, D. C.

Application February 6, 1947, Serial No. 726,891

3 Claims. (Cl. 244—103)

1

My invention relates to improvements in airplane undercarriages with castering wheels and the object of my improvements is to provide a simple mechanism which will provide greater resistance to castering during taxiing operations than it will during the landing operation.

I attain this object by the mechanism illustrated in the accompanying drawing, in which—

Figure 1 is a vertical section of the mechanism taken on line AA of Fig. 2; Fig. 2 is a vertical section taken on line BB of Fig. 1; and Figure 3 is a section taken on the line CC of Fig. 1.

Similar numerals refer to similar parts throughout the several views.

Part 1 is the upper part of the shock strut and has lugs 2 for attachment to the airplane structure. Also fastened rigidly to part 1 is the plate 3 which separates chamber 10 from chamber 11. Plate 3 is provided with a rectangular opening 4 through which part 5 is free to slide. Part 5 is a torsional spring rigidly mounted in the upper end of the wheel fork 7 and attached to its upper end is the piston 6 which separates chamber 9 from chamber 10. Rigidly attached to the wheel fork 7 is the cylinder 8 which is free to reciprocate and rotate relative to part 1.

Chambers 10 and 11 are filled with oil and chamber 9 contains both oil and air. Oil passages 12 are provided in piston 6 and clearances are provided between part 5 and the ends of the rectangular opening 4 in part 3. The latter can be made variable by having the cross section of part 5 vary along its length.

It will be apparent from the drawings and the above description that the wheel fork 7 may rotate relative to part 1 and hence relative to the airplane but that such rotation is opposed by the torsional deflection of that part of spring 5 between parts 7 and 3. It will also be apparent that the effective length of spring 5 decreases as the shock strut collapses and hence will offer a greater resistance to wheel castering when the strut is collapsed than it will when the strut is extended.

2

It will be understood that the above description and the accompanying drawings comprehend only the general embodiment of my invention and that various changes in detail construction, proportion and arrangement of parts, including the substitution of other types of shock strut, may be made without sacrificing any of the advantages of my invention while still remaining within the scope of my appended claims.

What I claim new is:

1. An airplane shock strut including an outer cylinder, an inner cylinder slidably and rotatably mounted in the outer cylinder, and a torsion spring element fixed in one cylinder and slidably but irrotationally mounted in the other cylinder.

2. An airplane shock strut including an outer cylinder, an inner cylinder slidably and rotatably mounted in the outer cylinder, a closure at one end of the inner cylinder having a non-circular aperture therein, and a torsion spring element fixed in the outer cylinder and passing through but not rotatable in said non-circular aperture.

3. An airplane shock strut including an outer cylinder, an inner cylinder slidably and rotatably mounted in the outer cylinder, a closure at one end of the inner cylinder having a non-circular aperture therein, and a torsion spring element of non-circular cross section fixed in the outer cylinder and passing through said aperture, said spring having a cross section which is non-uniform along its length to provide a variable clearance between said spring and the walls of said aperture.

JOHN HARLIN GEISSE.

REFERENCES CITED

The following references are of record in the file of this patent:

UNITED STATES PATENTS

| Number | Name | Date |
|---|---|---|
| 395,147 | Jeffery | Dec. 25, 1888 |
| 2,191,359 | Thornhill | Feb. 20, 1940 |